3,124,464
EMULSIFIER BLENDS AND A METHOD FOR
IMPROVING FROZEN CONFECTIONS
William H. Knightly and Gabriel P. Lensack, Wilmington, Del., assignors to Atlas Chemical Industries, Inc., Wilmington, Del., a corporation of Delaware
No Drawing. Filed Mar. 31, 1961, Ser. No. 99,717
13 Claims. (Cl. 99—136)

This invention relates to new and useful emulsifier blends and a method for making an improved frozen confection. In particular, the invention relates to dry, free-flowing emulsifier blends useful in frozen confections and to a method for making a frozen confection having improved dryness and whipping ability. In addition, the invention relates to a dry, free-flowing emulsifier blend-stabilizer composition.

In the frozen confection art, which includes the manufacture of compositions such as ice cream, mellorine, ice milk and sherbets, it is customary to include in the freezing mixture ingredients other than cream, milk, sugar and flavoring for the purpose of improving the consistency and texture of the final product and to prevent the growth of ice crystals during storage. Stabilizers and emulsifiers are added in small amounts to almost all of the frozen confections which are sold commercially. Conventional stabilizers often used in frozen confections are sodium alignate, sodium carboxymethyl cellulose, natural and synthetic gums, gelatin, etc. The main purposes of the stabilizer are to produce frozen confections having a smooth body and to prevent the growth of ice crystals during storage.

Emulsifiers also serve several functions when used in frozen confections. The emulsifiers stabilize the emulsion of fat in water, improve whipping ability, shorten the time required to produce a predetermined overrun and produce a smoother, dryer texture. Currently, the emulsifiers generally used in frozen confections comprise esters prepared by reacting higher fatty acids and polyhydric alcohols. The following are representative of ester emulsifiers which have been used in frozen confections: propylene glycol monostearate; glyceryl monostearate; polyoxyethylene oleate and polyoxyethylene stearate (with varying lengths of the ethylene oxide chain); higher fatty acid esters of sorbitol, sorbitan and other polyhydric alcohols, e.g. sorbitan monostearate; and the ethylene oxide derivatives of such fatty acid esters.

At the present time, most of the stabilizers used in frozen confections are dry, free-flowing powders. Some of the emulsifiers currently used for improving whipping ability are also dry, free-flowing powders. This makes it convenient to form easily handled, dry, free-flowing emulsifier-stabilizer compositions which do not cake during storage and which are readily added to frozen confection mixes prior to freezing. However, one of the problems encountered in the frozen confection art is that the best emulsifiers for improving the dryness and texture of frozen confections are either liquids or soft pastes which form hard to handle, sticky, gummy compositions when added to the dry, free-flowing stabilizer. In addition, these liquid and paste-like emulsifiers cause the stabilizer to agglomerate and disperse unevenly in the frozen confection mix.

It is an object of this invention to provide emulsifier blends which improve both the dryness of frozen confections and the whipping ability of frozen confection mixes.

Another object of this invention is to provide dry, free-flowing emulsifier blends which improve the whipping ability of frozen confection mixes and the dryness of frozen confections.

A further object of this invention is to provide dry, free-flowing emulsifier blend-stabilizer compositions which are easy to handle and which when added to frozen confection mixes improve the dryness of frozen confections and the whipping ability of the mix.

A still further object of this invention is to provide a method for making an improved frozen confection by incorporating a blended emulsifier in a confection mix prior to freezing the mix.

Other objects and purposes of this invention will be obvious to those skilled in the art from the following description of the invention.

It has been discovered that a dry, free-flowing emulsifier blend, which is useful in improving the dryness of frozen confections and the whipping ability of frozen confection mixes, can be prepared by melting a hard glyceride emulsifier, adding thereto, preferably in liquid form, an emulsifier which improves the dryness of frozen confections, stirring this mixture, and then cooling and comminuting the emulsifier blend.

The hard, partial glyceride portion of the emulsifier blend may comprise any normally solid glyceride or glyceride mixtures but not those glycerides which are plastic solids or viscous liquids, for they will not form dry, free-flowing blends when mixed with liquid or plastic emulsifiers which are good drying agents for frozen confections. In general, the hard glyceride should have a melting point of at least about 130° F. or a melting point range having a minimum temperature of about 130° F. In other words, the hard glyceride must have a minimum melting temperature of at least about 130° F. Since the critical factor is that the hard glyceride function as a drying agent for the liquid emulsifier component, there is no upper limit on the melting point or range of the glyceride component. Though pure monoglycerides or diglycerides may be used, mono- and diglycerides are generally so closely associated that it is difficult to separate them, and so it is convenient to use mono- and diglyceride mixtures in carrying out this invention, provided however, that the mixture has a melting range having a minimum temperature of about 130° F. Though triglycerides may also be used, the partial glycerides are preferred for hard triglycerides may tend to impair the performance of the liquid emulsifier as an improver of frozen confection dryness. Any type of normally solid glyceride can be used such as glycerol palmitates and stearates.

The other component of the emulsifier blends of this invention is an emulsifier which improves the dryness of frozen confections. These emulsifiers are generally liquids though some are in the form of soft pastes, such as polyoxyethylene (20) sorbitan tristearate sold commercially under the trademark Tween 65. (The number in parenthesis indicates moles of ethylene oxide.) As used in this specification and claims, the term "liquid emulsifiers which improve the dryness of frozen confections" also includes emulsifiers which are soft pastes and which are readily liquefied by melting. Examples of commercially available "liquid emulsifiers which improve the dryness of frozen confections" are the above-mentioned Tween 65, polyoxyethylene (20) sorbitan monooleate (Tween 80) and glycerol monooleate (Atmos 300).

Several polyoxyethylene sorbitan esters may be useful in the emulsifier blends of this invention as the liquid emulsifier component, such as the tristearate and monooleate esters, previously mentioned. The ethylene oxide contents of the polyoxyethylene sorbitan esters may vary over a wide range, the important criteria for use in this invention being that these emulsifiers improve the dryness of frozen confections and that they are either liquids or soft pastes. In general, the ethylene oxide content is not critical, though an ethylene oxide content of from about 8 to about 50 moles is usually preferred.

Since the emulsifiers blended with the hard glyceride emulsifiers are either liquids or soft pastes, it was considered that at best a sticky paste composition would result from the blending. Unexpectedly, it was discovered that substantial amounts of the liquid emulsifiers which improve the dryness of frozen confections could be blended with a hard glyceride emulsifier to form a dry, free-flowing emulsifier blend. If the "liquid emulsifier" is a soft paste, it may be blended with a hard glyceride emulsifier in amounts ranging from about 5 to about 40 percent by weight of the total blend and still form a dry, free-flowing blend. Amounts greater than about 40 weight percent increase the blend's tendency to cake during storage and may yield a sticky blend. Amounts less than about 5 weight percent are insufficient to have a significant improvement in drying over the glyceride alone when the emulsifier blend is added to the frozen confection mix. If the "liquid emulsifier" is normally a liquid, lesser amounts of it may be added to the hard glyceride, generally from about 3 to about 30 weight percent and still obtain a dry, free-flowing blend.

If the "liquid emulsifier which improves the dryness of frozen confections" is normally a liquid, it is readily added to and dispersed in the melted glyceride component. If it is normally a soft paste, it may be melted and then added in liquid form to the melted glyceride component, or if the melted glyceride component is sufficiently hot, the paste-like emulsifier may be added to the hot glyceride and melted in situ.

It has also been discovered that by spray-cooling the hot liquid emulsifier-hard glyceride mixture, the melting point of the resultant emulsifier blend is increased over that of an identical blend which is merely mixed and cooled. Spray-cooling yields a better product having less tendency to cake during storage, and it permits the formation of dry, free-flowing blends containing greater amounts of the liquid emulsifier. Another method which may be used to form the emulsifier blend is to coat the hard glyceride with the "liquid emulsifier," such as by spraying the "liquid emulsifier" onto particles of the hard glyceride.

The dry, free-flowing emulsifier blends of this invention have several advantages, particularly in the manufacture of frozen confections. Since these emulsifier blends are dry and free-flowing, they are easily handled, measured and packaged and are easy to disperse in frozen confection mixes. These emulsifier blends are particularly useful to manufacturers of stabilizers for use in frozen confections, for the emulsifier blend can be mixed with a dry stabilizer to form a dry, free-flowing emulsifier blend-stabilizer composition. Examples of stabilizers which may be used are sodium alginate, sodium carboxymethyl cellulose and gelatin. The proportions of the components of the emulsifier-stabilizer composition is a matter of operator's choice. In addition to the above-mentioned advantages of the dry, free-flowing emulsifier blends, neither of the emulsifier blend components interferes with the functioning of the other component. In fact, when a polyoxyethylene sorbitan ester is added to a glyceride an unexpected synergistic effect between the two components which results in improving the whipping and drying properties of the glyceride component has been observed.

The improvement in the whipping properties of the glyceride emulsifier was very surprising. It has been found that the whipping properties of glycerides, whether they be liquid, plastic or normally solid, can be improved by blending the glyceride with a polyoxyethylene compound selected from the group consisting of polyoxyethylene derivatives of higher fatty acids and polyoxyethylene derivatives of higher fatty acid esters of polyhydric alcohols containing from 3 to 6 hydroxyl groups. Higher fatty acids which may be used to prepare the polyoxyethylene derivatives include fatty acids having from 12 to 22 carbon atoms, such as lauric, stearic, palmitic, oleic, behenic, etc. Typical of the polyoxyethylene compounds which may be used to improve the whipping properties of glyceride emulsifiers are polyoxyethylene sorbitan monooleates, polyoxyethylene sorbitan tristearates, polyoxyethylene glyceryl monostearate, polyoxyethylene stearic acid, polyoxyethylene lauric acid, polyoxyethylene oleic acid, etc. The improved whipping properties of the glycerides was particularly surprising when polyoxyethylene (20) sorbitan monooleate was blended with a glyceride, for this compound is a known whipping depressant.

For improving whipping properties, the polyoxyethylene compounds may be added to glyceride emulsifiers in amounts ranging from about 3 to about 40 percent by weight based on the combined weight of glyceride and polyoxyethylene compound. Greater amounts of polyoxyethylene compound unduly increases the cost of the emulsifier mixture and better results can be achieved using less polyoxyethylene compound.

As previously stated, the emulsifier blends of this invention are particularly useful for improving frozen confections. The addition of these emulsifier blends results in a frozen confection mix which has good whipping properties, i.e. produces good overrun rapidly, and a final product which has good dryness. The emulsifier blend may be added to frozen confection mixes in small amounts, generally ranging from about 0.01 percent to about 0.30 percent by weight of the frozen confection mix.

The following examples illustrate specific embodiments of the compositions and methods of this invention. Unless otherwise stated, all parts are by weight.

*Example I*

An emulsifier blend of this invention was prepared in the following manner. 80 parts by weight of a mono- and diglyceride of fat-forming fatty acids mixture, containing about 42% alphamonoglyceride and having a melting range (M.R.) of 135–142° F., was melted and 20 parts by weight of liquid polyoxyethylene (20) sorbitan monooleate was added to it with stirring. These two materials are miscible, and the polyoxyethylene (20) sorbitan monooleate was easily dispersed uniformly throughout the glyceride. The mixture was cooled to 40° F. and allowed to solidify at this temperature. The solid mass of emulsifier blend was then ground into a dry, free-flowing powder form.

*Example II*

The following are representative of the dry free-flowing emulsifier blends of this invention prepared in accordance with the method of Example I. The numbers in parentheses following polyoxyethylene represents the moles of ethylene oxide per mole of sorbitan ester.

|  | Parts |
|---|---|
| (1) Monoglyceride mixture prepared from hydrogenated peanut oil (M.P. 147° F.) | 60 |
| Polyoxyethylene (20) sorbitan tristearate | 40 |
| (2) Mono- and diglycerides of fat-forming fatty acids containing about 55% alpha-monoglyceride (M.R. 141–144° F.) | 90 |
| Polyoxyethylene (20) sorbitan monooleate | 10 |
| (3) Mono- and diglycerides of fat-forming fatty acids containing about 42% alpha-monoglyceride (M.R. 135–142° F.) | 80 |
| Polyoxyethylene (20) sorbitan monooleate | 20 |
| (4) Mono- and diglycerides of fat-forming fatty acids prepared from hydrogenated tallow and containing about 54% alpha-monoglyceride (M.R. 139–143° F.) | 70 |
| Polyoxyethylene (20) sorbitan tristearate | 30 |
| (5) Mono- and diglycerides of fat-forming fatty acids containing about 42% alpha-monoglyceride (M.R. 135–142° F.) | 75 |
| Glycerol monooleate | 25 |
| (6) Mono- and diglycerides of fat-forming fatty acids containing about 42% alpha-monoglyceride (M.R. 135–142° F.) | 60 |
| Polyoxyethylene (20) sorbitan monooleate | 40 |

Example III

Dry, free-flowing emulsifier blends were also prepared by spray cooling. Two batches of a mono- and diglyceride of fat-forming fatty acids mixture, containing abuot 42% alpha-monoglyceride and having a melting range of 135–142° F., were melted. One batch amounted to approximately 240 pounds and the other batch was about 150 pounds. About 60 pounds of liquid polyoxyethylene (20) sorbitan monooleate was added to the 240 pound batch with stirring. This hot mixture was sprayed into air at room temperature and upon cooling in the air it formed a dry, free-flowing product in a fine bead form. This emulsifier blend product was found to be substantially free of caking after storage for 100 days.

About 100 pounds of polyoxyethylene (20) sorbitan tristearate, which is a viscous paste-type material, was melted and then added with stirring to the 150 pound batch of glyceride. This mixture was spray-cooled and also formed a substantially non-caking, dry, free-flowing, bead-like product.

The melting points of these spray-cooled emulsifier blends were determined by the American Oil Chemists Society method and a very interesting effect was discovered as demonstrated by the following data:

|  | Melting Points, ° C. | |
|---|---|---|
|  | Glyceride-Polyoxyethylene (20) Sorbitan Tristearate Blend (60/40) | Glyceride-Polyoxyethylene (20) Sorbitan Monooleate Blend (80/20) |
| Merely mixed and cooled blend | 129.2 | 134.6 |
| Spray-cooled blend | 136.4 | 140.0 |

These results indicate that by spray-cooling the emulsifier blend, the melting point of the blend is raised. This increased melting point is indicative of a better product, one having less tendency to cake during storage. In addition, spray-cooling permits the formation of a dry, free-flowing emulsifier blend containing greater amounts of the polyoxyethylene sorbitan ester.

Example IV

The following is a standard formula for an ice cream mix which was used to prepare the ice creams in the examples which follow.

Ingredient: Parts
- Fresh cream (containing about 40% butterfat) — 30
- Non-fat, dry milk solids — 9.7
- Cane sugar — 15
- Stabilizer — 0.2
- Water — 45
- Emulsifier blend — About 0.1

The ice cream mixes were prepared with fresh cream (containing about 40% butterfat) and extra grade, low heat processed, non-fat dry milk solids. Cane sugar was used as a sweetener. The stabilizer was a commercial food grade carboxymethyl cellulose of medium viscosity. The emulsifier blends of this invention were used unless stated otherwise. The ingredients were mixed by first adding the liquid ingredients to a kettle and then adding the dry, powdered solid ingredients with stirring.

The mixes were pasteurized, by batch method, at 160° F. for 20 minutes. After pasteurizing, they were homogenized at 160° F. first under 2000 p.s.i.g. and then under 500 p.s.i.g. in a two stage laboratory homogenizer. The mixes were cooled to 38° F. and aged overnight at about 38–40° F. The mixes were then frozen at 23° F. in a 10 quart batch type freezer for about 20 minutes. The final ice cream product was evaluated for whipping time, overrun and dryness (gloss).

Example V

An emulsifier blend of a mono- and diglyceride of fat-forming fatty acids mixture, containing about 42% alpha-monoglyceride and having a melting range of 135–142° F., with polyoxyethylene (20) sorbitan tristearate was evaluated as an ice cream emulsifier at several emulsifier levels. In addition, in order to determine whether the effect of blending the two emulsifiers was additive or synergistic, the two components of the emulsifier blend were evaluated separately at amounts equivalent to the amount present in the blend at each particular emulsifier level. It should be noted that in all of the ice cream dryness evaluations (gloss) the lower the value, the dryer the ice cream. In these examples, the dryness was determined by the glossmeter technique, using a Gardner P-4 Portable Glossmeter. A correlation of glossmeter readings and visual appearance is as follows:

- 20–25 — Very wet.
- 16–19 — Wet.
- 13–15 — Slightly wet.
- 10–12 — Dry.
- 5–9 — Very dry.

The whipping ability of the ice cream mixes was determined by measuring overrun by weight and the time required to reach 90% overrun. Overrun is the amount of ice cream obtained in excess of the amount of mix used and is caused by whipping air into the mix. Percent overrun by weight is determined by the following formula:

$$\text{Percent overrun} = \frac{\text{wt. of unit of mix} - \text{wt. of equal volume of ice cream}}{\text{wt. of equal volume of ice cream}}$$

| Emulsifier | Blend Ratio | Emulsifier Level (wt. percent) | Minimum Gloss | Gloss at 90% overrun | Time (min.) to 90% overrun | Maximum overrun obtained |
|---|---|---|---|---|---|---|
| Glyceride/Polyoxyethylene Sorbitan Ester | 60/40 | 0.02 | 11 | 11 | 13.5 | 96 |
| Do | 60/40 | 0.04 | 11 | 12 | 13 | 96 |
| Do | 60/40 | 0.66 | 11 | 11 | 12 | 98 |
| Do | 60/40 | 0.08 | 11 | 12 | 12 | 104 |
| Do | 60/40 | 0.10 | 11 | 11 | 12 | 96 |
| Polyoxyethylene Soribtan Tristearate |  | 0.008 | 10 | 10 | 16 | 90 |
| Do |  | 9.016 | 12 | (13) | (16) | 83 |
| Do |  | 0.024 | 10.5 | (10.5) | (16) | 86 |
| Do |  | 0.032 | 10.5 | 10.5 | 15 | 92 |
| Do |  | 0.040 | 11.5 | 11.5 | 13 | 89 |
| Glyceride |  | 0.012 | 12 | (12.5) | (15) | 88 |
| Do |  | 0.024 | 13 | 13 | 14 | 96 |
| Do |  | 0.336 | 11 | 11 | 15 | 90 |
| Do |  | 0.048 | 13.5 | 14.5 | 15 | 92 |
| Do |  | 0.060 | 12 | 12 | 15 | 91 |
| Control (No emulsifier) |  |  | 14.5 | (14.5) | (15) | 88 |

Parenthesis indicates gloss and time at maximum overrun when 90% overrun was not obtained.

From these results it is clear that the addition of the emulsifier blend to the ice cream mix greatly improved the dryness, the overrun obtained and the rate of obtaining good overrun. Furthermore, it is clear that there is a synergistic effect achieved by blending the glyceride and the polyoxyethylene (20) sorbitan tristearate for both the dryness and the whipping properties were much better than when the glyceride was used as the sole emulsifier. This is a clear demonstration of the upgrading of the glyceride emulsifier. While using the polyoxyethylene (20) sorbitan tristearate alone resulted in somewhat better dryness than the blend, the whipping propetries of the ice cream mixes containing the blend were much better than those mixes containing only the polyoxyethylene (20) sorbitan tristearate.

Example VI

An emulsifier blend of a mono- and diglyceride of fat-forming fatty acids mixture, containing about 42% alpha-monoglyceride and having a melting range of 135–142° F., with polyoxyethylene (20) sorbitan monooleate was also evaluated as an ice cream emulsifier at several emulsifier levels. The emulsifier blend was also tested for synergistic effect as in the previous example.

| Glyceride/polyoxyethylene (20) sorbitan monooleate: | Maximum overrun obtained (percent) |
|---|---|
| 100/0 | 94.5 |
| 95/5 | 98 |
| 90/10 | 101 |
| 80/20 | 102 |
| 70/30 | 107.5 |
| 60/40 | 102 |
| 50/50 | 96 |

This indicates that for best results a 70/30 ratio should be used, though up to 40 weight percent of polyoxyethylene (20) sorbitan monooleate may be used.

Example VIII

Tests were made to determine the effect of using the emulsifier blends of this invention in ice milk. The following conventional ice milk formulation was used:

| Ingredient— | Amount (gms.) |
|---|---|
| 40% cream | 600 |
| Sugar | 840 |
| Milk solids | 808 |
| Corn syrup solids | 240 |
| Carboxy methyl cellulose (high viscosity) | 9 |
| Water | 3497 |
| Emulsifier blend | 6–15 |

| Emulsifier | Blend Ratio | Emulsifier Level | Minimum Gloss Obtained | Gloss at 90% overrun | Time (min.) to 90% overrun | Maximum overrun obtained |
|---|---|---|---|---|---|---|
| Glyceride/Et.O. Sorbitan Ester | 80/20 | 0.03 | 10 | 10 | 15 | 90 |
|  |  | 0.04 | 10 | 10 | 13 | 98 |
|  |  | 0.05 | 11 | 12 | 14 | 95 |
|  |  | 0.06 | 11 | 11 | 15 | 92 |
|  |  | 0.07 | 11 | 11 | 13.5 | 101 |
|  |  | 0.08 | 10 | 10 | 13 | 96 |
|  |  | 0.09 | 10 | 10 | 13 | 98 |
|  |  | 0.10 | 8.5 | 9 | 12 | 105 |
| Polyoxyethylene (20) Sorbitan Monooleate |  | 0.006 | 12 | (12) | (15) | 87 |
|  |  | 0.008 | 10 | (10) | (15) | 86 |
|  |  | 0.010 | 8 | (8) | (13) | 86 |
|  |  | 0.012 | 11 | (11) | (16) | 86 |
|  |  | 0.014 | 10.5 | 10.5 | 15 | 92 |
|  |  | 0.016 | 9 | 9 | 15 | 90 |
|  |  | 0.018 | 9 | 9 | 15 | 92 |
|  |  | 0.02 | 9 | 9 | (15) | 92 |
| Glyceride |  | 0.024 | 13 | 13.5 | 13 | 96 |
|  |  | 0.032 | 13 | 14 | 14 | 98 |
|  |  | 0.040 | 15 | 15 | 13 | 90 |
|  |  | 0.048 | 13 | (13) | (13) | 82 |
|  |  | 0.056 | 15.5 | (16) | (14) | 83 |
|  |  | 0.064 | 15.5 | (15.5) | (13) | 88 |
|  |  | 0.072 | 12 | (12) | (13) | 88 |
|  |  | 0.080 | 13 | (13) | (13) | 82 |
| Control (no emulsifier) |  |  | 15 | (15) | (15) | 88 |

Parenthesis indicates gloss and time to maximum overrun when 90% overrun was not obtained.

These results show that the emulsifier blend improved the dryness of the ice cream and also the overrun and the rate of obtaining good overrun. It was to be expected that the addition of the polyoxyethylene (20) sorbitan monooleate would improve the dryness of the ice cream to a certain extent, but it was surprising that the addition of the glyceride had very little or no effect on the ability of the sorbitan emulsifier to improve dryness. The most unexpected effect was in the improved whipping properties achieved by using a blend, for the sorbitan emulsifier is a known whipping depressant and yet when it is added to a glyceride it greatly improved the whipping properties of the glyceride. This is another clear demonstration of the synergistic effect achieved by using the emulsifier blends of this invention.

Example VII

A series of evaluations was made to determine if varying the amount of polyoxyethylene (20) sorbitan monooleate had any effect upon the improvement in the glyceride whipping properties achieved when an emulsifier blend is added to an ice cream mix. In the following table, all data represents an average of two evaluations.

The ice milk was prepared in a conventional manner for preparing ice milks, similar to the ice cream preparation presented in Example IV. The tests were conducted using emulsifier blends comprising mono- and diglycerides of fat-forming fatty acids containing about 42% alpha-monoglyceride (M.R. 135–142° F.) blended with (1) polyoxyethylene 20 sorbitan monooleate (Tween 80) and (2) polyoxyethylene 20 sorbitan tristearate (Tween 65). The results of two evaluations were as follows:

| Emulsifier | Amount (wt. percent) | Avg. Minimum Gloss Obtained | Avg. Gloss at 90% Overrun | Avg. Time to 90% Overrun (min.) | Avg. Max. Overrun (Percent) |
|---|---|---|---|---|---|
| Control (none) |  | 21 | 27.5 | 14 | 83 |
| Glyceride/Tween 80 (80/20) | 0.1 | 14.5 | 17.25 | 9.8 | 116 |
| Do. | 0.15 | 13.5 | 16 | 10.65 | 113 |
| Do. | 0.2 | 13.0 | 14.25 | 9.8 | 120 |
| Do. | 0.25 | 13.5 | 14.75 | 10.1 | 123 |
| Glyceride/Tween 65 (60/40) | 0.1 | 15 | 15 | 10.75 | 108 |
| Do. | 0.15 | 14 | 19 | 11.3 | 109 |
| Do. | 0.2 | 15.5 | 19 | 10.6 | 109 |
| Do. | 0.25 | 16.5 | 19.5 | 10.5 | 109 |

These results clearly demonstrate that the emulsifier blends of this invention are also very effective emulsifiers for ice milk.

*Example IX*

The emulsifier blends which were tested in ice milk in Example VIII were also evaluated in mellorine. The following mellorine formulation was used:

| Ingredient— | Amount (gms.) |
|---|---|
| Hydrogenated vegetable oil | 720 |
| Milk solids | 660 |
| Sugar | 900 |
| Carboxymethyl cellulose (medium viscosity) | 12 |
| Salt | 3 |
| Water | 3699 |
| Emulsifier blend | 6–12 |

The mellorine was prepared in a conventional manner, and the results were as follows:

| Emulsifier Blend | Amount (wt. percent) | Minimum Gloss Obtained | Gloss at Max. Overrun | Time to Max. Overrun (min.) | Max. Overrun Obtained (Percent) |
|---|---|---|---|---|---|
| Control | | 19 | 23 | 15 | 74 |
| Glyceride/Tween 65(60/40) | 0.1 | 10 | 10.5 | 15 | 75 |
| Do. | 0.15 | 8 | 8 | 16 | 82.5 |
| Do. | 0.2 | 8 | 8 | 16 | 84 |
| Glyceride/Tween 80(80/20) | 0.1 | 12 | 13 | 16 | 64 |
| Do. | 0.15 | 7 | 7 | 15 | 68 |
| Do. | 0.2 | 7 | 7 | 15 | 78 |

These results indicate that the emulsifier blends of this invention are also effective emulsifiers for mellorine.

*Example X*

Emulsifier blends of a mixture of mono- and diglycerides of a fat-forming fatty acid blended with polyoxethylene (40) stearic acid (Myrj 52) were evaluated as ice cream emulsifiers. In particular, the emulsifier blends were tested for synergistic effect as in Examples V and VI. In carrying out these evaluations, two types of glyceride were used: a mixture of mono- and diglycerides of fat-forming fatty acids containing about 55% alpha-monoglyceride (commercially known as Atmos 150) and a mixture of mono- and diglycerides of fat-forming fatty acids containing about 42% alpha-monoglyceride (commercially known as Atmul 84). The results were as follows:

| Emulsifier | Blend Ratio | Emulsifier Level (wt. percent) | Minimum Gloss Obtained | Maximum Overrun Obtained | Time (min.) to 90% Overrun |
|---|---|---|---|---|---|
| Control (no emulsifier) | | | 14 | 88 | 15 |
| Myrj 52 | | 0.1 | 9 | 103 | 15 |
| Atmos 150 | | 0.1 | 10 | 102 | 14 |
| Atmul 84 | | 0.1 | 11 | 98 | 17 |
| Atmos 150/Myrj 52 | 90/10 | 0.1 | 10 | 102 | 15 |
| Do | 80/20 | 0.1 | 10 | 110 | 15 |
| Do | 70/30 | 0.1 | 8 | 108 | 15 |
| Atmul 84/Myrj 52 | 80/20 | 0.1 | 10 | 102 | 15 |
| Do | 70/30 | 0.1 | 9 | 108 | 17 |
| Do | 60/40 | 0.1 | 8.5 | 105 | 15 |

These results clearly demonstrate that this type of emulsifier blend performs very well as an ice cream emulsifier. The data indicates that there was a synergistic effect occurring in the blends which generally gave better dryness and better whipping properties than either component used alone and at the same amount as the blend.

The term "consisting essentially of," as used in the following claims, includes compositions containing the named ingredients in the proportions stated and any other ingredients which do not deleteriously affect the compositions for the purposes stated in the specification.

Having completely described this invention, what is claimed is:

1. A dry, free-flowing emulsifier composition for a frozen confection mix consisting essentially of a blend of a hard partial glyceride emulsifier, said partial glyceride having a minimum melting temperature of at least about 130° F., and a liquid emulsifier which improves the dryness of frozen confections, said liquid emulsifier being a polyoxyethylene derivative of a higher fatty acid ester of a polyhydric alcohol containing from 3 to 6 hydroxyl groups, and said polyoxyethylene compound being present in amounts ranging from about 3 to about 40% by weight of said blend.

2. The composition of claim 1 in which the polyoxyethylene compound is polyoxyethylene sorbitan monooleate.

3. The composition of claim 1 in which the polyoxyethylene compound is polyoxyethylene sorbitan tristearate.

4. The composition of claim 2 in which the polyoxyethylene sorbitan monooleate is present in amounts ranging from about 3 to about 30% by weight of the total composition.

5. The composition of claim 4 in which the polyoxyethylene compound is polyoxyethylene (20) sorbitan monooleate.

6. The composition of claim 3 in which the polyoxyethylene sorbitan tristearate is present in amounts ranging from about 5 to about 40% by weight of the total composition.

7. The composition of claim 6 in which the polyoxyethylene compound is polyoxyethylene (20) sorbitan tristearate.

8. In a method for making an improved frozen confection, the improvement which comprises incorporating a blend of a partial glyceride emulsifier and a polyoxyethylene sorbitan monooleate in a confection mix prior to freezing the mix, said polyoxyethylene sorbitan monooleate amounting to from about 3 to about 30% by weight of the partial glyceride plus polyoxyethylene compound.

9. In a method for making an improved frozen confection, the improvement which comprises incorporating a blend of a partial glyceride emulsifier and a soft polyoxyethylene sorbitan tristearate in a confection mix prior to freezing the mix, said polyoxyethylene sorbitan tristearate amounting to from about 5 to about 40% by weight of the partial glyceride plus polyoxyethylene compound.

10. A method for preparing a dry, free-flowing emulsifier blend which comprises melting a hard partial glyceride, said partial glyceride having a minimum melting temperature of at least about 130° F., adding to said melted partial glyceride about 3% to about 40% by weight of the blend of a liquid emulsifier which improves the dryness of frozen confections, said liquid emulsifier being a polyoxyethylene derivative of a higher fatty acid ester of a polyhydric alcohol containing from 3 to 6 hydroxyl groups and cooling and comminuting the emulsifier blend to form a dry, free-flowing emulsifier blend.

11. The method of claim 10 in which the emulsifier blend is cooled and comminuted simultaneously by spray cooling.

12. The method of claim 11 in which the polyoxyethylene compound is polyoxyethylene sorbitan monooleate.

13. The method of claim 11 in which the polyoxyethylene compound is polyoxyethylene sorbitan tristearate.

References Cited in the file of this patent

UNITED STATES PATENTS

| 2,445,226 | Landers | July 13, 1948 |
| 2,587,369 | Nash | Feb. 26, 1962 |
| 2,685,517 | Dunmire | Aug. 3, 1954 |
| 2,823,129 | Steinitz | Feb. 11, 1958 |

UNITED STATES PATENT OFFICE
CERTIFICATE OF CORRECTION

Patent No. 3,124,464                                March 10, 1964

William H. Knightly et al.

It is hereby certified that error appears in the above numbered patent requiring correction and that the said Letters Patent should read as corrected below.

Columns 5 and 6, in the table, under the heading "Emulsifier Level (wt. percent)", line 3 thereof, for "0.66" read -- 0.06 --; same table, same column, line 7 thereof, for "9.016" read -- 0.016 --.

Signed and sealed this 4th day of August 1964.

(SEAL)
Attest:

ERNEST W. SWIDER                               EDWARD J. BRENNER
Attesting Officer                                   Commissioner of Patents